Dec. 23, 1958  A. TÁRCZY-HORNOCH  2,865,105
MULTIPURPOSE THEODOLITE

Filed Nov. 29, 1954  2 Sheets-Sheet 1

INVENTOR.
ANTAL TÁRCZY-HORNOCH
BY
Young, Emery & Thompson
ATTYS.

Dec. 23, 1958  A. TÁRCZY-HORNOCH  2,865,105
MULTIPURPOSE THEODOLITE
Filed Nov. 29, 1954  2 Sheets-Sheet 2

INVENTOR.
ANTAL TÁRCZY-HORNOCH
BY
Young, Emery & Thompson
ATTYS

United States Patent Office 2,865,105
Patented Dec. 23, 1958

2,865,105

MULTIPURPOSE THEODOLITE

Antal Tárczy-Hornoch, Sopron, Hungary, assignor to "Licencia" Talalmanyokat Ertekesito Vallalat, Budapest, Hungary, a Hungarian enterprise Application November 29, 1954, Serial No. 471,841

Claims priority, application Hungary November 28, 1953

2 Claims. (Cl. 33—46)

This invention relates to angle measuring instruments of the theodolite type having a top part or theodolite portion without leveling screws, a bottom part or base portion, and interengaging means for disconnectably coupling said top part with said bottom part.

It is known that instruments constructed for subsurface surveyings have—in contradistinction to land measuring instruments—to meet special requirements which are due to the special circumstances prevailing in such places. With subsurface surveying the measurements have frequently to be effected in narrow galleries with short base distances. Moreover, with regard to the often considerable traffic of such places, the measurings have to be effected in short periods of time. For like reasons, the instruments often cannot be supported by means of the well known tripods so that the surveying has to be carried out in the manner of precise traversing. The instruments are then supported by brackets fixed to the side wall or timbering of the gallery, or else suspended on pins which are fixed to the gallery ceiling. This necessitates surveyings carried out simply, quickly and yet with a suitable degree of exactness, although the requirements as to exactness are not always as severe as with land surveying. A substantial requirement is that the instruments and the targets may readily be interchanged and placed so as to occupy a like position as regards their horizontal projection.

It has been suggested to meet the above mentioned requirements by means of angle measuring instruments such as the socketed theodolite of Breithaupt consisting likewisely of a theodolite portion and a base portion, and of interengaging means which comprise a socket provided on the base portion, and a pivot provided on the theodolite portion and adapted to fit into the socket when the theodolite portion and the base portion are coupled with one another. The base portion is associated with targets provided with like pivots which fit into the socket thereof. Though the stationary base portion ensures a sort of positive centering of the theodolite portion and the targets which are alternately coupled with the base portion by means of their pivots and socket, respectively, yet it necessitates a series of such targets even for the more simple measuring methods of moderate accuracy.

The main object of the present invention is to obviate the above said drawbacks and to provide a multipurpose theodolite particularly adapted to carry out subsurface surveyings. To this purpose the interengaging means for disconnectably coupling the top part of the theodolite with its bottom part consists of an upright means such as a Freiberg prism provided on the bottom part, and of a socket means provided on the top part and adapted to receive the upright means when the top part is coupled with the bottom part. Such an arrangement permits to form the base portion as a target since the upright means of the bottom part can be provided with a point of measuring so that—at least for surveying with moderate requirements as to accuracy—separate targets may be dispensed with and the surveying can be performed by means of a theodolite portion and e. g. three base portions without any further accessories.

Another object of the present invention is to provide a base portion with vernier means for adjusting the mutual angular position of the upright means and the bottom part. In this case the upright means is rotatably arranged in the base portion and, if the theodolite portion is of the simple or the reiteration type, the system as a whole is directly rendered so as to be of the repetition type.

Still another object of the present invention is to provide the upright means with target means adapted to be surveyed from below the bottom part and with a source of light for illuminating the target means. Such an embodiment of the inventive theodolite is particularly adapted for effecting measurements in steep galleries.

A further object of the present invention is to provide the leveling screws of the instrument on the bottom part or base portion thereof whereby the latter may be leveled independently from the former. This arrangement has its significance when the base portion serves as a target or for supporting such targets.

A still further object of the present invention is to provide the alidade of the theodolite with a system of antifriction bearing means adapted to enable the alidade to rotate in standing as well as in suspending position of the theodolite portion so that the instrument may equally be used in its upright and its upside-down position.

Another object of the present invention is to provide the theodolite portion with optical means for enabling its graduations to be read in a transverse direction with respect thereto. This may be necessary if the theodolite is to be used close to the ceiling of a gallery and its graduations could not be read from above.

Still another object of the present invention is to provide the graduations of the theodolite portion on support means made of transparent material. Such support means may be provided with two series of graduation numerals of oppositely increasing values and mutually reversed positions whereby the upright and upside-down positions, respectively, of the theodolite are associated each with a series of conveniently readable graduation numerals.

Other objects and features of the present invention will be described by taking reference to the accompanying drawings which show—by way of example—one embodiment thereof. In the drawings.

Figure 1:
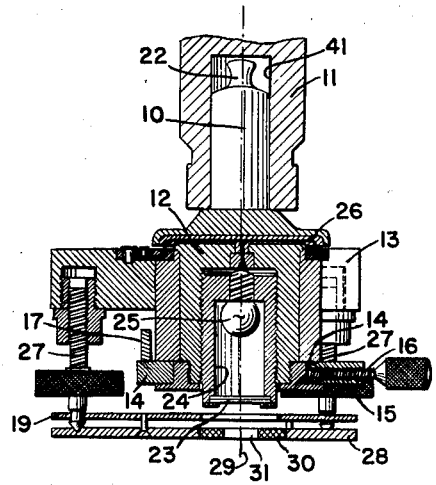
Fig. 1 is a sectional view of the base portion taken along the line I—I of Fig. 2.
Figure 2:
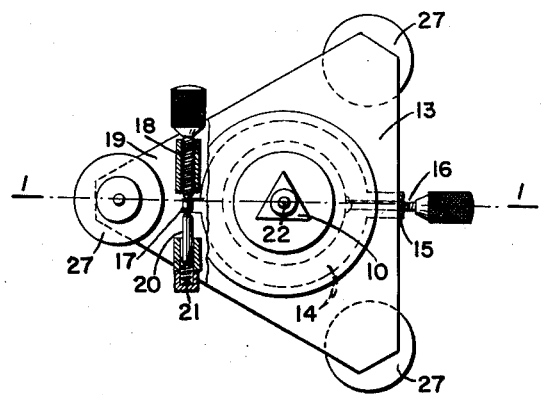
Fig. 2 shows the top view of the base portion.
Figures 3, 4:
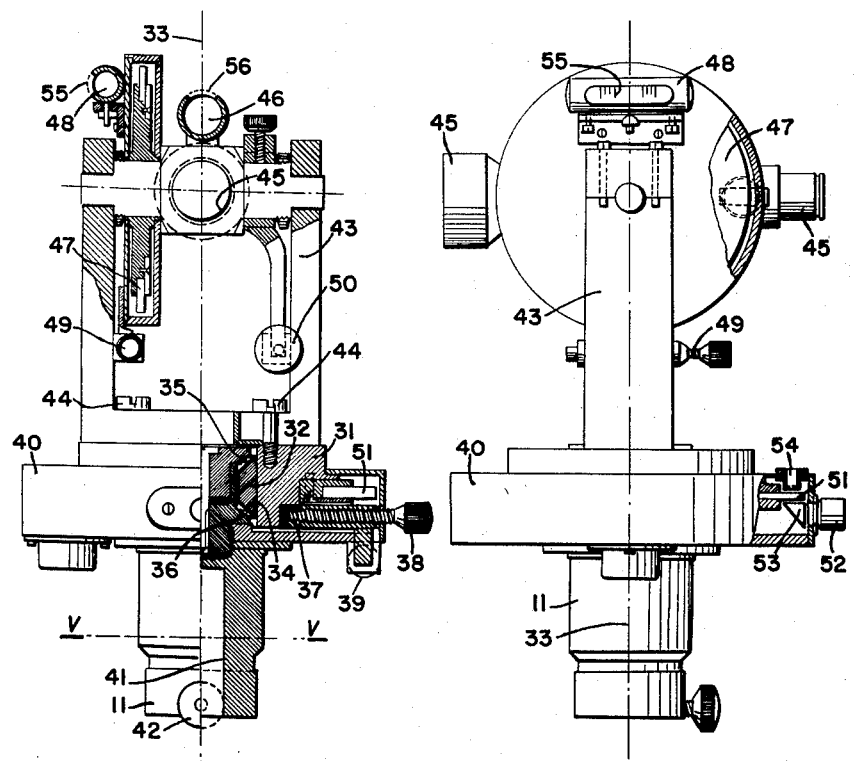
Fig. 3 represents an elevational view of the theodolite portion partly in section.
Fig. 4 illustrates another elevational view of the theodolite portion taken at right angles to the former.
Figure 5:
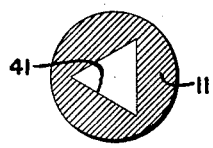
Fig. 5 is a cross sectional view of a detail taken along the line V—V of Fig. 3.

Referring to the drawings, the theodolite has a bottom part or base portion with leveling screws, shown in Figs. 1 and 2, and a top part or theodolite portion shown in Figs. 3 to 5, interengaging means being provided for disconnectably coupling the former with the latter. These interengaging means consist of an upright means 10 such as a Freiberg prism provided on the bottom part, and of socket means 11 provided on the top part and adapted to receive the upright means 10 when the top part is coupled with the bottom part as shown in Fig. 1. The upright means 10 is integral with a trunnion 12 rotatably arranged in the body 13 of the bottom part. The lower extremity of the trunnion 12 is surrounded by a ring 14 which has an extension 15 fixed to it. A screw 16 supported by the extension 15 serves for clamping the ring 14 to the trunnion 12. The ring 14 has an upright 17 attached to it which serves as the abutment for a vernier screw 18 supported by a base plate 19 of the bottom part as is obvious from Fig. 2. The vernier screw 18 has a counter part 20 likewise supported by the base plate 19 and urged by a compression spring 21 to abut against the opposite side of the upright 17. The vernier means 16 to 21 serve for adjusting the mutual angular position of the trunnion 12 and the body 13 of the bottom part or base portion.

On the top portion of the upright means 10 there is a point of measuring or auxiliary target 22 which serves to pointing purposes when measurings of moderate accuracy such as distance measuring by means of measuring tapes have to be carried out.

On the other hand, the trunnion 12 is provided also with target means adapted to be surveyed from below the bottom part or base portion, a light source means being provided for illuminating it. With the represented embodiment the target means is formed by an opaline disk 23 supported by a hollow plug 24 which is fixed to the trunnion 12 in any suitable manner. The light source means is formed by an electric bulb 25 which is connected electrically to a suitable voltage source by means of a lead-in conductor 26 and through the mass of the body 13, respectively.

The body 13 of the base portion is supported by means of leveling screws 27 which are, in turn, supported by a main base plate 28. The main base plate 28 has a per se known central opening coaxially arranged with the axis 29 of rotation of the trunnion 12 and adapted to be screw-threadedly engaged with annular disks 30 likewise provided with a central opening 31 as is well known to those skilled in the art.

Referring to Figs. 3 to 5, the top part or theodolite portion of the inventive theodolite has an alidade 31 incorporated into it, which is supported by a system of ball bearing means adapted to enable the alidade 31 to rotate in upright or standing as well as in upside-down or suspended position of the top part or theodolite portion. With the represented embodiment the system of ball bearing means consists of a ball bearing ring 32 coaxially arranged with the alidade 31, i. e. the alidade 31 and the ball bearing ring 32 have the same axis 33 of rotation. Furthermore, the ball bearing ring 32 is provided with oppositely inclining conical guiding surfaces 34 and 35, one of the counter-surfaces of which being referred to by reference numeral 36. The alidade 31 is provided with a clamping ring 37 adapted to be operated by a clamping screw 38 as was the case with the trunnion 12 of the bottom part or base portion shown in Figs. 1 and 2. The alidade 31 having been clamped by the ring 37 by means of the screw 38, it can be further adjusted by vernier means 39 supported by the middle part 40 of the top part or theodolite portion of the instrument.

The socket means 11 is of the hollow shaft type, its cross-sectional view being shown in Fig. 5. It is fixed to the middle part 40 in any suitable manner. The cavity 41 of the socket means 11 is formed so as to enable it to be disconnectably coupled with the upright means 10. A screw 42 serves for fixing the mutual coupled position of both main parts of the instrument.

The instrument 43 well known in the art is supported by the alidade 31 to which it is secured by means of screw bolts 44. The instrument proper comprises an elevational telescope 45 with a spirit level 46 and with a graduation support 47 for reading the value of the elevational angle. A further spirit level provided for the elevational or vertical circle is referred to by reference numeral 48. Vernier means 49 serve for adjusting the elevational position of the graduation support 47 whereas that of the telescope 45 is adjusted by vernier means 50 in a manner well known in the art.

The horizontal or limbus circle of the instrument is provided on a disk 51 preferably made of transparent material. With the represented embodiment it is made of glass and provided with graduation numerals of oppositely increasing values and mutually reversed positions, optical means being provided for enabling the graduations to be read in a transverse direction with respect to the axis 33, i. e. to the theodolite portion proper. With the represented embodiment the above said optical means comprises a magnifier 52 and a prism 53 which serve for projecting the rays of a light source falling in through an aperture 54 into the magnifier 52. Thus, the image of the graduation marks on the disk 51 is rendered visible through the magnifier 51 and the graduation numerals readable whether the theodolite proper is in standing or suspended position.

The possibility of manipulating the instrument in narrow galleries is further enhanced by providing the spirit levels 46 and 48 with graduation means 55 and 56, respectively, having divisions extended onto the sides of the former so as to be capable of being read in transverse direction with respect to the above mentioned axis 33, i. e. to the top part or theodolite portion of the instrument.

In operation, the top part or theodolite portion and the bottom part or base portion of the instrument are coupled by means of the interengaging means 10 and 11 with one another, the mutual axial position of the two parts being fixed by the screw 42. The instrument is leveled by means of the screws 27 and thereafter the surveying carried out. Minute adjustments are effected by means of the vernier means 38, 39 and 49, 50 respectively, in a manner well known to those skilled in the art. The elevational or vertical circle values and the limbus or horizontal circle values will be read by means of the graduations provided on the disks 47 and 51, respectively.

If a mine gallery to be surveyed is too narrow for effecting readings in the usual manner, the limbus values will be read sideways by means of the optical system 51, 52, 53, 54. The same applies to the leveling of the instrument by means of the spirit level 48 the graduations 55 of which may likewise be read in a sideways manner. After the measurements having been carried out, the clamping screw 42 will be loosened and the two parts of the instrument be disconnected whereafter the bottom part or base portion may serve as a target for the next measurement, the top part or theodolite portion of the instrument being accommodated on a like base portion where the next measurement has to be carried out.

The top part or theodolite portion of the instrument is fixed in a like manner on a suitable upright such as a Freiberg prism of a bracket if the usual tripods cannot be used because of lack of space.

If the instrument is to be supported in a suspended position by means of a pin fixed to the ceiling of a gallery, the interengagement of the socket means 11 of the top part or theodolite portion and of the pin is effected in the same manner as was the case with the bottom part or base portion. The instrument, however, occupies, in this case, an upside down or reversed position so that the graduation numerals of the limbus circle could not be read in a convenient manner were it not for the two series of graduation numerals of oppositely increasing values and mutually reversed positions. By means of these two series of graduation numerals there is always one which appears in normal position when observed through the magnifier 52.

With deep gallery surveyings a voltage is applied to the electric bulb 25 the light of which illuminates the opaline target 23. This can be surveyed from below through the aperture 3. For sake of convenience of better illumination the body 13 of the bottom part or base portion may be lowered by means of the leveling screws 27 so as to have the insert 24 and the opaline target 23 to penetrate into the aperture of the base 28 to which purpose the annular ring 30 is removed or replaced by another one having a suitable aperture 31.

The bottom part or base portion proper serves, apart from its being a target, for surveying of moderate accuracy, also as a support for targets of high accuracy such as are used in land surveying processes. In this case it is of significance that the upright 10 is capable of being turned by means of the trunnion 12 and having its angular position with respect to the body 13 adjustable by means of the vernier system 14 to 21. Likewise it is of importance that it is capable of being leveled by means of the leveling screws 27 which are supported by the bottom part or base portion rather than by the top part or theodolite portion.

Obviously, the inventive instrument forms a multipurpose theodolite which is suitable for meeting a number of various requirements such as supportability by brackets or suspension pins, angle measuring with or without positive centering, repetition, reiteration, steep gallery and supplementary surveying.

What I claim is:

1. A multipurpose theodolite having a base portion, a trunnion arranged for rotation in said base portion, a downwardly open axial cavity in said trunnion, a target means in said axial cavity for being surveyed from below said base portion, a light source means within said cavity for illuminating said target means, an upright means on said trunnion, a top portion comprising a measuring instrument, and a socket means with a cavity on said top portion for axially slidable engagement with said upright means so as to enable said top portion to be detachably supported by said base portion, the cross sections of said upright means and said cavity, respectively, being selected so as to prevent mutual rotation of said upright means and said socket means when engaged with one another.

2. A multipurpose theodolite having a base portion, an upright means on said base portion, a top portion comprising a measuring instrument, a socket means with a cavity on said top portion for axially slidable engagement with said upright means so as to enable said top portion to be detachably supported by said base portion, the cross sections of said upright means and said cavity, respectively, being selected so as to prevent mutual rotation of said upright means and said socket means when engaged with one another, and levelling screws provided on said base portion so as to enable the position of said upright means to be adjusted.

References Cited in the file of this patent

UNITED STATES PATENTS

| | | |
|---|---|---|
| 552,751 | Denison | Jan. 7, 1896 |
| 565,742 | Greenfell | Aug. 11, 1896 |
| 674,107 | Traut | May 14, 1901 |
| 761,481 | Hein | May 31, 1904 |
| 879,122 | Saegmuller | Feb. 11, 1908 |
| 1,187,249 | Brown | June 13, 1916 |
| 1,209,107 | Berger | Dec. 19, 1916 |
| 1,754,872 | Baker | Apr. 15, 1930 |
| 2,190,555 | Toce et al. | Feb. 13, 1940 |
| 2,261,201 | Wilson | Nov. 4, 1941 |
| 2,280,057 | Brunson | Apr. 21, 1942 |
| 2,353,272 | Simmons et al. | July 11, 1944 |
| 2,570,458 | Kowalczyk | Oct. 9, 1951 |
| 2,592,941 | Moore | Apr. 15, 1952 |
| 2,619,002 | Baker | Nov. 25, 1952 |
| 2,647,320 | Keuffel | Aug. 4, 1953 |

FOREIGN PATENTS

| | | |
|---|---|---|
| 22,756 | Great Britain | 1903 |